US012781803B2

(12) United States Patent
Yoshikawa

(10) Patent No.: US 12,781,803 B2
(45) Date of Patent: Nov. 3, 2026

(54) FIXING DEVICE FOR INSERT BEARING UNIT AND INSERT BEARING UNIT

(71) Applicant: NTN CORPORATION, Osaka (JP)

(72) Inventor: Mitsuhiko Yoshikawa, Mie (JP)

(73) Assignee: NTN CORPORATION, Osaka (JP)

( * ) Notice: Subject to any disclaimer, the term of this patent is extended or adjusted under 35 U.S.C. 154(b) by 12 days.

(21) Appl. No.: 18/980,410

(22) Filed: Dec. 13, 2024

(65) Prior Publication Data

US 2025/0207637 A1 Jun. 26, 2025

(30) Foreign Application Priority Data

Dec. 25, 2023 (JP) ................................ 2023-218007

(51) Int. Cl.
*F16C 35/063* (2006.01)
*F16C 33/60* (2006.01)
*F16C 19/06* (2006.01)

(52) U.S. Cl.
CPC .......... *F16C 35/063* (2013.01); *F16C 33/605* (2013.01); *F16C 19/06* (2013.01); *F16C 2226/10* (2013.01)

(58) Field of Classification Search
CPC .... F16C 33/586; F16C 33/605; F16C 35/063; F16C 35/073
See application file for complete search history.

(56) References Cited

U.S. PATENT DOCUMENTS 4,403,814 A 9/1983 Koss et al.
4,537,519 A * 8/1985 LaRou .................. F16C 23/084 384/537
5,417,500 A * 5/1995 Martinie ............... F16D 1/0864 384/537
6,036,372 A * 3/2000 Okamoto ............. F16D 1/0864 384/537
11,835,093 B2 * 12/2023 Kuckhoff ............. F16C 35/047

FOREIGN PATENT DOCUMENTS

EP 1111258 A1 * 6/2001 ............ F16C 35/063
JP 2020-125771 8/2020

* cited by examiner

*Primary Examiner* — James Pilkington
(74) *Attorney, Agent, or Firm* — Wenderoth, Lind & Ponack, L.L.P.

(57) ABSTRACT

A ring body configured to be fitted over the extension ring portion is provided. The ring body is a non-endless ring body having a cut portion formed in a part of the ring body. Opposed cut-portion end surfaces of the cut portion are separated from each other by a predetermined distance under a state in which the ring body is press-fitted over the extension ring portion of the inner ring. The cut-portion end surfaces are brought relatively closer to each other to radially contract the ring body by fastening a fastening member to be mounted into the ring body so that a radially contracting force for radial contraction is applied to the extension ring portion to bring the extension ring portion into close contact with the rotary shaft.

6 Claims, 5 Drawing Sheets

FIXING DEVICE FOR INSERT BEARING UNIT AND INSERT BEARING UNIT

TECHNICAL FIELD

The present invention relates to a fixing device for an insert bearing unit, which is configured to fix a rotary shaft to an insert bearing unit formed by combining a bearing and a bearing box, and to the insert bearing unit.

BACKGROUND ART

There exist, as a method of fixing a rotary shaft to an insert bearing unit formed by combining a bearing (rolling bearing) and a bearing box, a method using set screws (for example, a method described in Japanese Patent Application Laid-open No. 2020-125771) and a method using a collar (ring member) (for example, a method described in U.S. Pat. No. 4,403,814).

According to the method using set screws (method described in Japanese Patent Application Laid-open No. 2020-125771), an extension portion is provided to an inner ring of a bearing, and screw holes are formed in the extension portion. The set screws are threadably engaged with the screw holes to thereby bring distal end portions of the set screws into pressure-contact with the rotary shaft.

Further, according to the method using a collar (ring member) (method described in U.S. Pat. No. 4,403,814), a shaft mounting portion having a cylindrical shape is provided to an inner ring. A plurality of (four) slits are formed in the shaft mounting portion at intervals in a circumferential direction. Then, the ring member is fitted over the shaft mounting portion. In this case, screw holes extending from an outer surface to an inner surface of the ring member are formed in the ring member. Set screws are threadably engaged with the screw holes. As a result, among separate pieces (segments) of the shaft mounting portion having the slits, separate pieces corresponding to the set screws are pushed against a shaft, and the other separate pieces are pulled toward the shaft. In this manner, the rotary shaft (shaft) can be fixed to the insert bearing unit.

SUMMARY OF INVENTION

Technical Problem

As described in Japanese Patent Application Laid-open No. 2020-125771, with the method using set screws, the set screws are disposed at predetermined pitches in the circumferential direction. Thus, all the set screws are required to be fastened by the same amount, and hence centering requires time and effort. Further, a large number of working steps are required for the plurality of set screws, and hence workability is low.

Further, as described in U.S. Pat. No. 4,403,814, the shaft mounting portion is radially contracted by using the collar so as to allow the rotary shaft to be fixed to the insert bearing unit. In this case, before the collar is fastened, the collar is fitted over the shaft mounting portion by so-called clearance fit, that is, loose fit.

Thus, when the screws are fastened to the collar, there is a risk in that the collar may be shifted by the amount corresponding to a clearance with respect to the rotary shaft, and thus workability in mounting is low. Further, when the collar is fixed in a shifted state as described above, the collar is fixed in a state of being inclined with respect to the rotary shaft. Thus, there is a risk in that stable performance cannot be obtained as the insert bearing unit.

Thus, the present invention has an object to provide a fixing device for an insert bearing unit, which enables easy and accurate fixing of a rotary shaft to an insert bearing unit, and an insert bearing unit comprising the fixing device for an insert bearing unit.

Solution to Problem

According to at least one embodiment of the present invention, there is provided a fixing device for an insert bearing unit, the fixing device being configured to fix a rotary shaft to an insert bearing unit formed by combining a bearing and a bearing box, the fixing device comprising: an extension ring portion configured to be fitted over the rotary shaft, the extension ring portion being formed integrally and continuously with an inner ring of the bearing; and a ring body configured to be fitted over the extension ring portion. The extension ring portion has slits extending in an axial direction and being opened axially outward. The ring body is a non-endless ring body having a cut portion formed in a part of the ring body. Opposed cut-portion end surfaces of the cut portion are separated from each other by a predetermined distance under a state in which the ring body is press-fitted over the extension ring portion of the inner ring. The cut-portion end surfaces are brought relatively closer to each other to radially contract the ring body by fastening a fastening member to be mounted into the ring body so that a radially contracting force for radial contraction is applied to the extension ring portion to bring the extension ring portion into close contact with the rotary shaft.

The fixing device for an insert bearing unit according to at least one embodiment of the present invention allows the ring body to be press-fitted over the extension ring portion of the inner ring. Thus, the ring body and the extension ring portion of the inner ring are not brought into a loose-fit state but are brought into an interference-fit state. Hence, the extension ring portion can be stably brought into close contact with the rotary shaft by fastening the fastening member mounted into the ring body without causing misalignment between an axial center of the ring body and an axial center of the rotary shaft.

Further, the cut-portion end surfaces can be brought relatively closer to each other by fastening the fastening member mounted into the ring body. Thus, mounting work onto the rotary shaft can be facilitated.

It may be configured that the fastening member comprises a bolt member to be arranged on one cut-portion end surface side, and a screw hole with which the bolt member is to be threadably engaged is formed on another cut-portion end surface side, and the cut-portion end surfaces are brought relatively closer to each other by threadably advancing the bolt member into the screw hole.

With the configuration as described above, the extension ring portion can be brought into close contact with the rotary shaft in a simple and quick manner with high accuracy by fastening one bolt member.

It is preferred that an axial center direction of the screw hole be inclined from an inner side toward an opening so as to be separated apart from an intermediate line of the ring body in a thickness direction. When the axial center direction of the screw hole is inclined as described above, ease in fastening work with a tool for fastening the bolt member (for example, a torque wrench) can be obtained. That is, the ring body is in the vicinity of the bearing box. When the axial center direction of the screw hole is not inclined unlike in the case described above, it may be difficult to engage a fastening tool for fastening the bolt member (for example, a socket of a torque wrench) with a head portion of the bolt member in some cases. With the inclination as described above, however, a space for achieving engagement can be ensured. Thus, the bolt member can be fastened in a stable manner.

It is preferred that the ring body have a recessed groove in a radially inner surface of the ring body so as to be 180-degrees opposite to the cut portion with respect to an axial center, the recessed groove extending in an axial direction and being opened on both end surfaces of the ring body. The recessed groove formed as described above facilitates the fastening of the bolt member and enables stable radial contraction. Thus, the extension ring portion can be stably brought into close contact with the rotary shaft.

It is preferred that the ring body have a radially inner surface comprising a first part and a second part, the first part being configured to be brought into pressure-contact with the extension ring portion and the second part being configured to define a slight clearance between the second part and an outer peripheral surface of the extension ring when the ring body is fitted over the extension ring portion, and that the first part be formed on an axially outer side of the extension ring portion.

With the configuration as described above, when the ring body is radially contracted, segment claws (segment claws defined by forming slits extending in an axial direction) of the extension ring portion are bent radially inward. When the first part is formed on the axially outer side of the extension ring portion, a radially contracting force from the ring body is applied to the axially outer side of the extension ring portion to thereby be able to stably generate a radially inward bending force. Meanwhile, when the first part is formed on the axially inner side of the extension ring portion, the radially contracting force from the ring body is applied to the axially inner side of the extension ring portion. In such a case, a large bending force is required to bent the segment claws inward. Thus, a larger fastening force for the bolt member is required.

Further, the radially inner surface of the ring body is divided into the first part to be brought into contact with the rotary shaft, and the second part to define a slight clearance between the second part and the outer peripheral surface of the rotary shaft. As a result, a pressure-contact length between the ring body and the extension ring portion is reduced, and hence fitting with pressure-contact is also facilitated.

According to at least one embodiment of the present invention, there is provided an insert bearing unit, comprising: a bearing comprising: an inner ring and an outer ring; rolling elements provided between the inner ring and the outer ring; and a cage configured to hold the rolling elements; and a bearing box, wherein the insert bearing unit comprises the fixing device for an insert bearing unit.

Advantageous Effects of Invention

According to the present invention, fixing work for the rotary shaft and the insert bearing unit can be facilitated, and hence a worker who performs mounting is not required to have skills or experience. In addition, the ring body can be prevented from being inclined, and hence precise mounting (fixing) can be performed.

DESCRIPTION OF EMBODIMENTS

Figure 2:
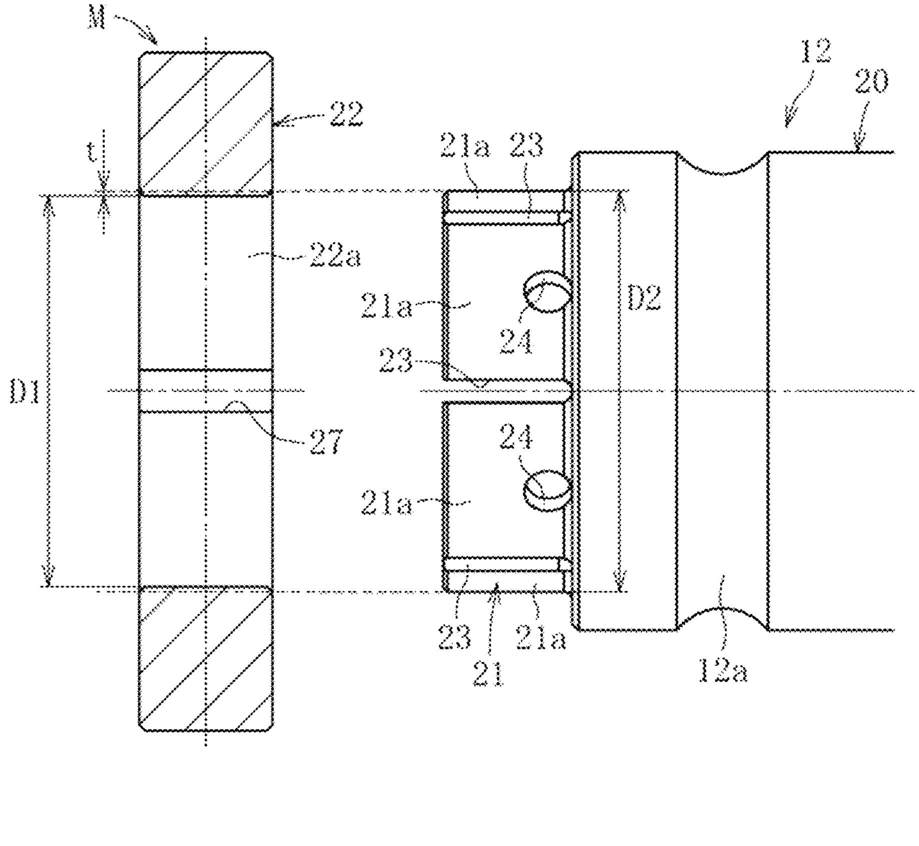
FIG. 2 is a view for illustrating a relationship between a ring body and an extension ring portion.
Figure 3:
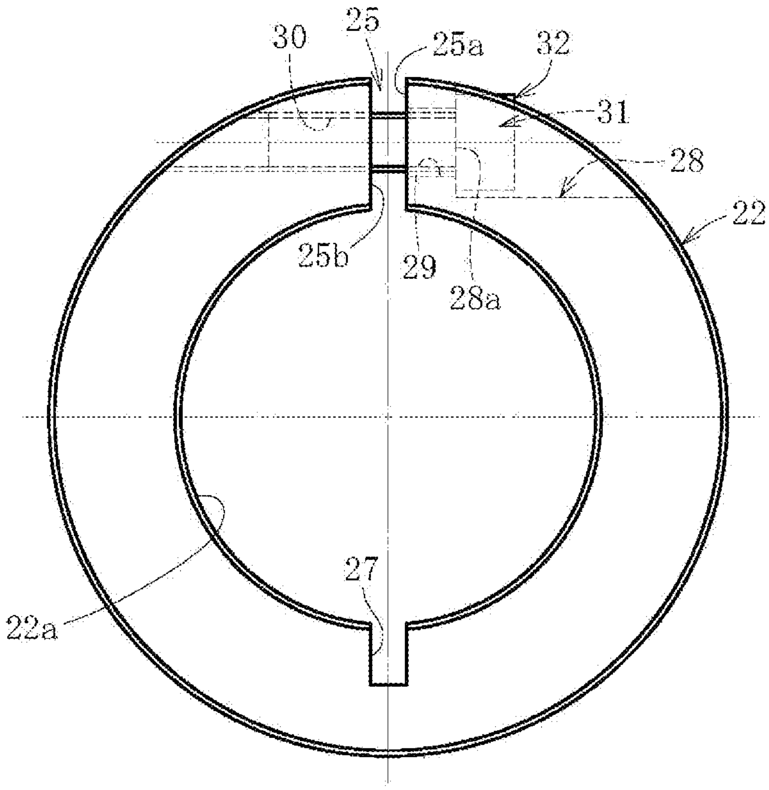
FIG. 3 is a front view of the ring body.
Figure 4:
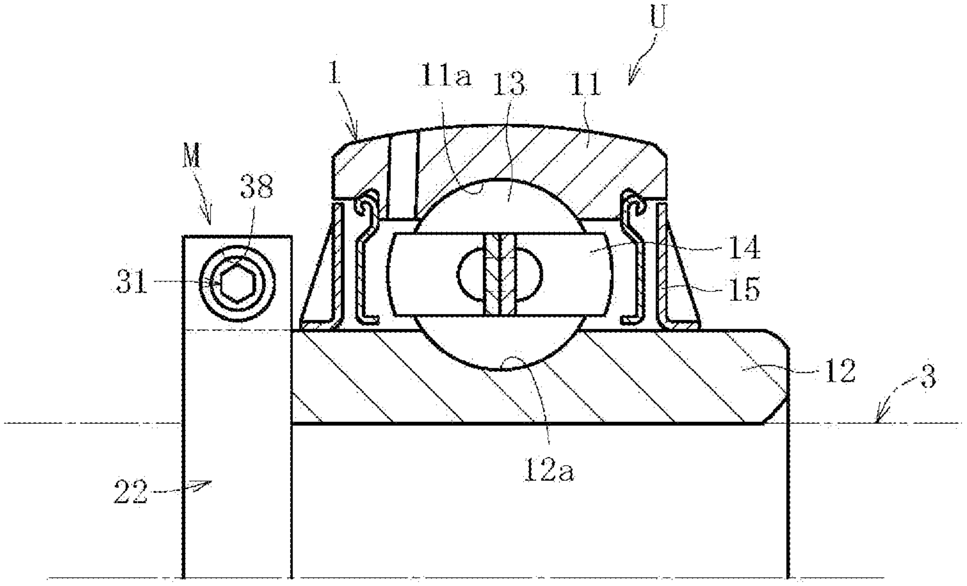
FIG. 4 is a sectional view for illustrating relevant parts of an insert bearing unit.

Now, an embodiment of the present invention is described with reference to FIG. 1 to FIG. 7. In FIG. 4, there is illustrated an insert bearing unit U formed by combining a bearing (rolling bearing) 1 and a bearing box 2 (see FIG. 5). The insert bearing unit U is fixed to a rotary shaft 3 (see FIG. 5) through intermediation of a fixing structure M. The rolling bearing 1 illustrated in FIG. 4 comprises an outer ring 11, an inner ring 12, rolling elements 13, a cage 14, and a sealing device 15. The rolling elements 13 are provided between the outer ring 11 and the inner ring 12. The cage 14 holds the rolling elements 13. The sealing device 15 closes a grease enclosed space between the outer ring 11 and the inner ring 12. Thus, a raceway groove 11*a* is formed in a radially inner surface of the outer ring 11, and a raceway groove 12*a* is formed in a radially outer surface of the inner ring 12. The rolling elements 13 are fitted between the raceway grooves 11*a* and 12*a*.

Figure 5:
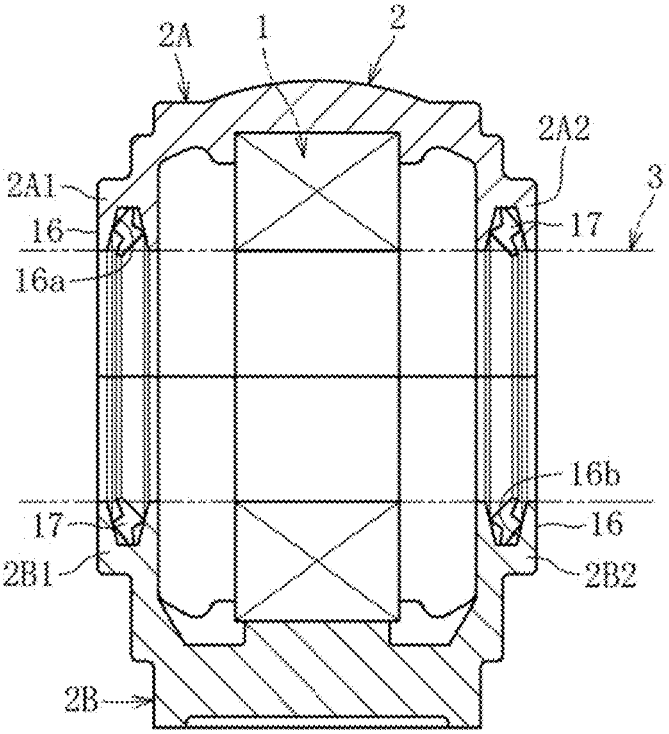
FIG. 5 is a sectional view for illustrating a bearing box of the insert bearing unit.

As illustrated in FIG. 5, the bearing box 2 comprises an upper box 2A on an upper side and a lower box 2B on a lower side. The bearing box 2 is formed by combining the upper box 2A and the lower box 2B on the upper and lower sides. The upper box 2A and the lower box 2B are coupled and integrated with each other through intermediation of a coupling member. Inner flange portions 2A1 and 2A2, each having a semi-arc-like shape, are formed at axial ends of the upper box 2A. Inner flange portions 2B1 and 2B2, each having a semi-arc-like shape, are formed at axial ends of the lower box 2B.

Under the state in which the upper box 2A and the lower box 2B are coupled to each other to form the bearing box 2 as described above, the inner flange portions 2A1 and 2A2 of the upper box 2A form an inner flange portion 16 having a ring shape, and the inner flange portions 2B1 and 2B2 of the lower box 2B form an inner flange portion 16 having a ring shape. Recessed circumferential grooves 16*a* and 16*b* are formed in radially inner surfaces of the inner flange portions 16, respectively. Sealing members 17 are fitted into the recessed circumferential grooves 16*a* and 16*b*, respectively.

Figure 1:
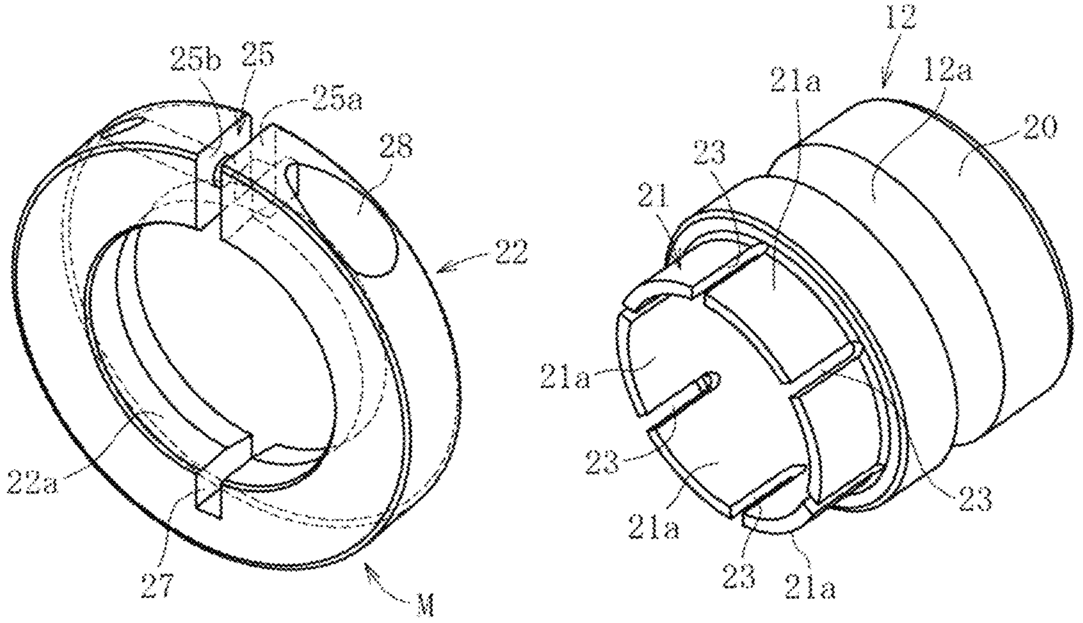
FIG. 1 is a simplified exploded perspective view of relevant parts of a fixing structure according to at least one embodiment of the present invention.

As illustrated in FIG. 1, an extension ring portion 21 is formed integrally and continuously with the inner ring 12 of the bearing 1. That is, the inner ring 12 comprises: an inner ring main body 20 having the raceway groove 12*a*; and the extension ring portion 21. The fixing structure M comprises: the extension ring portion 21 formed integrally and continuously with the inner ring 12; a ring body 22 to be fitted over the extension ring portion 21; a fastening member 32 described later; and the like. The extension ring portion 21 has slits 23 extending in an axial direction. A plurality of (for example, six) slits 23 are formed at predetermined pitches (for example, 60-degree pitches) in a circumferential direction. Each of the slits 23 is opened axially outward. As illustrated in FIG. 2, the extension ring portion 21 is a short cylindrical body having an outer diameter smaller than an outer diameter of the inner ring main body 20, and an inner diameter substantially equal to an inner diameter of the inner ring main body 20. When various kinds of members are formed, their dimensions or sizes may be unequal and slightly different due to, for example, an error in design, an error in processing, or an error in assembly. Thus, the phrase "substantially equal" refers to including such a slight difference.

The plurality of slits 23 formed in the extension ring portion 21 define a plurality of segment claws 21*a* in the circumferential direction. Thus, when a radially inward pressing force acts on the extension ring portion 21, an axially outer side (side opposite to the inner ring main body) of each of the segment claws 21*a* is bent radially inward with respect to its inner ring main body side as a starting point (pivot). As illustrated in FIG. 2, each of the segment claws 21*a* has a penetrating hole 24 on a side closer to the inner ring main body 20. The penetrating hole 24 formed as described above facilitates radially inward bending of the axially outer side (side opposite to the inner ring main body) of each of the segment claws 21*a* with respect to its inner ring main body side as a starting point (pivot). In FIG. 1, the penetrating holes 24 are not shown.

The ring body 22 to be fitted over the extension ring portion 21 is formed of a ring member having a non-endless shape with a square or rectangular cross section. That is, as illustrated in FIG. 1 and FIG. 3, the ring main body 22 has a cut portion 25 formed in a part thereof. Further, a recessed groove 27 having a rectangular cross section is formed in a radially inner surface 22*a* of the ring body 22. In this case, the recessed groove 27 is formed in the radially inner surface 22*a* at a position 180-degrees opposite to the cut portion 25 (that is, on a side 180-degrees opposite to the cut portion 25 with respect to an axial center). Further, the recessed groove 27 extends in the axial direction and is opened on both end surfaces.

As illustrated in FIG. 2, an inner diameter dimension of the ring body 22 when the ring body 22 is in a free state is set slightly smaller than an outer diameter dimension of the extension ring portion 21. That is, when the inner diameter dimension of the ring body 22 is represented by D1 and the outer diameter dimension of the extension ring portion 21 is represented by D2, D1 and D2 are set to satisfy a relationship of $D1<D2$. When the ring body 22 is to be fitted over the extension ring portion 21, the ring body 22 is brought into a radially expanded state (that is, a state in which cut end surfaces 25*a* and 25*b* are relatively separated from each other) so as to be able to be fitted over the extension ring portion 21. After the ring body 22 is brought into an externally fitted state, a separating force between the cut end surfaces 25*a* and 25*b*, which enables the radially expanded state, is released. Then, the ring body 22 is radially contracted so as to be brought into a free state and then is brought into a fitted state of being fitted over the extension ring portion 21. This fitting is achieved by interference fit. That is, an interference margin "t" (see FIG. 2) is set to a value that allows the interference fit. Further, under the externally fitted state, a clearance having a predetermined dimension is defined between the cut end surfaces 25*a* and 25*b* of the cut portion 25, which are opposed to each other.

As illustrated in FIG. 3, a fastening member 32 is provided to the ring body 22. The ring body 22 is radially contracted by fastening the fastening member 32. In this case, the fastening member 32 is formed of a bolt member 31 provided on one cut end surface 25*a* side. Thus, as illustrated in FIG. 1, a cutout recessed portion 28 extending in a direction perpendicular to the cut end surfaces 25*a* and 25*b* is formed on one cut end surface 25*a* side. A bottom surface 28*a* of the cutout recessed portion 28 is opposed to the cut end surface 25*a*, and a through hole 29 opened on the cut end surface 25*a* is formed in the bottom surface 28*a*. Examples of the bolt member include a hexagon bolt, a hexagon socket bolt (cap screw), a hexagon socket round-head bolt, a hexagon socket countersunk bolt, and a hexagon socket set screw. In this case, any of the bolt members can be used as the bolt member 31.

Further, a screw hole 30 with which the bolt member 31 is to be threadably engaged is formed on another cut end surface 25*b* side. An axial center of the screw hole 30 formed on the another cut end surface 25*b* side and an axial center of the through hole 29 formed on the one cut end surface 25*a* side match each other.

Thus, when the bolt member 31 is threadably advanced into the screw hole 30 under a state in which the ring member 22 is press-fitted over the extension ring portion 21, the cut end surfaces 25*a* and 25*b*, which are opposed to each other with a predetermined distance therebetween, are brought relatively closer to each other. In this case, the recessed groove 27 is formed in the radially inner surface so as to be 180-degrees opposite to the cut portion 25. Thus, the cut end surfaces 25*a* and 25*b* are orbitally moved so as to be brought relatively closer to each other with respect to the recessed groove 27.

Next, fixing work for the rotary shaft 3 and the insert bearing unit U is described. First, the insert bearing unit U is fitted over the rotary shaft 3. Under this state, the rotary shaft 3 and the insert bearing unit U are not fixed to each other. Next, the ring body 22 is fitted over the extension ring portion 21 of the inner ring 12 of the bearing 1. Under this state, the extension ring portion 21 and the ring body 22 are in an interference-fit state. Thus, the extension ring portion 21 and the ring body 21 are not in a loose-fit state but are in a tight-fit state. Hence, misalignment between the ring body 22 and the extension ring portion 21 does not occur.

Next, the bolt member 31 is threadably advanced into the screw hole 30. As a result, the cut end surfaces 25*a* and 25*b* of the ring body 22 are brought relatively closer to each other to radially contract the ring body 22. In the radial contraction, the segment claws 21*a* of the extension ring portion 21 are pressed radially inward and are bent radially inward with respect to their inner ring main body side as a pivot. As a result, the segment claws 21*a* are evenly brought into pressure-contact with the rotary shaft 3. Hence, the rotary shaft 3 can be mounted into the insert bearing unit U.

The fixing device for an insert bearing unit according to the present invention allows the ring body 22 to be press-fitted over the extension ring portion 21 of the inner ring 12. Thus, the ring body 22 and the extension ring portion 21 of the inner ring 12 are not brought into a loose-fit state but are brought into an interference-fit state. Hence, the extension ring portion 21 can be stably brought into close contact with the rotary shaft 3 by fastening the fastening member 32 mounted into the ring body 22 without causing misalignment between an axial center of the ring body 22 and an axial center of the rotary shaft 3.

According to the present invention, fixing work for the rotary shaft 3 and the insert bearing unit U can be facilitated, and hence a worker who performs mounting is not required to have skills or experience. In addition, the ring body 22 can be prevented from being inclined, and hence precise mounting (fixing) can be performed.

In the embodiment described above, the inner surface (radially inner surface) of the ring body 22 has a cylindrical surface shape except for the recessed groove 27. Meanwhile, an inner surface of a ring body 22 illustrated in FIG. 6 comprises a first part **22*a*1 and a second part 22*a*2. When the ring body 22 is fitted over the extension ring portion 21, the first part 22*a*1 is brought into pressure-contact with an extension ring portion 21 and a slight clearance is defined between the second part 22*a*2 and an outer peripheral surface of the extension ring portion 21. In this case, the first part 22*a*1 is formed on an axially outer side of the extension ring portion 21, and the second part 22*a*2 is formed on an axially inner side of the extension ring portion 21**.

In this case, an inner diameter dimension of the first part **22*a*1 of the ring body 22 when the ring body 22 is in a free state is set slightly smaller than an outer diameter dimension of the extension ring portion 21. That is, when the inner diameter dimension of the first part 22*a*1 of the ring body 22 is represented by Da1, and the outer diameter dimension of the extension ring portion 21 is represented by D2, Da1 and D2 are set to satisfy a relationship of $Da1<D2$. That is, the ring body 22 can be fitted over the extension ring portion 21, and this fitting is achieved by interference fit. In this case, an interference margin "t" (see FIG. 2**) can be set to a value that allows the interference fit.

Further, when the ring body 22 is in a free state, the second part **22*a*2 of the ring body 22 is set slightly larger than the outer diameter dimension of the extension ring portion 21. That is, when the ring body 22 is fitted over the extension ring portion 21, the second part 22*a*2 and the extension ring portion 21 are fitted by clearance fit. That is, a clearance t2** is set to a value that allows the clearance fit.

Figure 6:
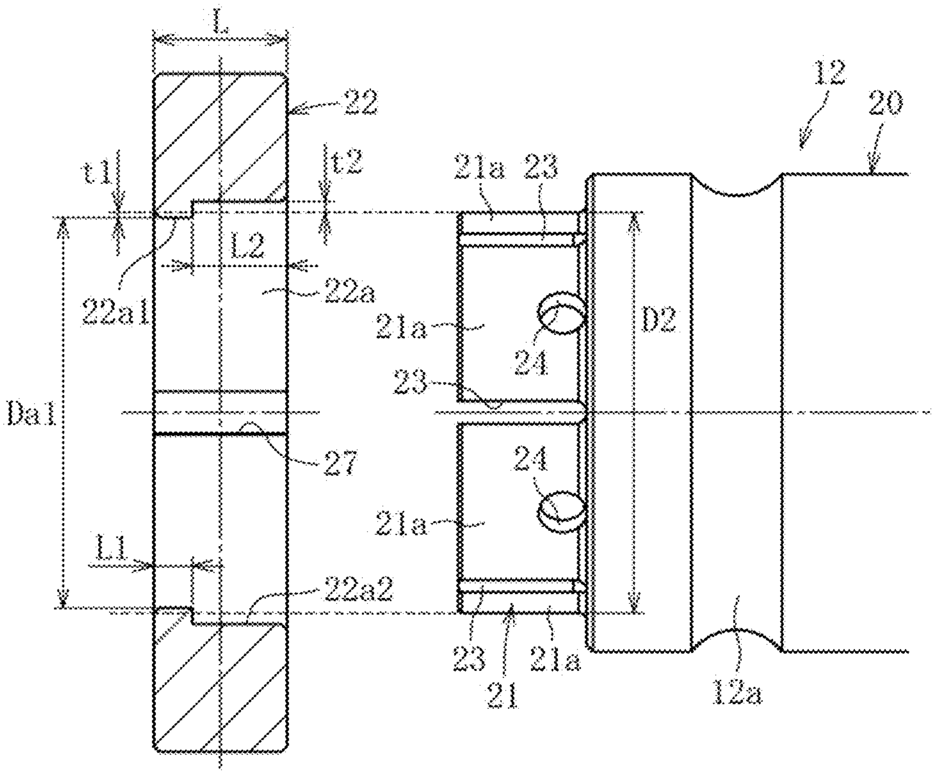
FIG. 6 is a view for illustrating a relationship between a ring body and an extension ring portion of a first modification example.

Also with the ring body 22 illustrated in FIG. 6, when the ring body 22 is radially contracted, segment claws **21*a* (segment claws defined by forming slits 23 extending in an axial direction) of the extension ring portion 21 are bent radially inward. When the first part 22*a*1 is formed on the axially outer side of the extension ring portion 21, a radially contracting force from the ring body is applied to the axially outer side of the extension ring portion 21 to thereby be able to stably generate a radially inward bending force. Meanwhile, when the first part 22*a*1 is formed on the axially inner side of the extension ring portion 21, the radially contracting force from the ring body is applied to the axially inner side of the extension ring portion 21. In such a case, a large bending force is required to bent the segment claws 21*a* inward. Thus, a larger fastening force for the bolt member 31** is required.

Further, the radially inner surface **22*a* of the ring body 22 is divided into the first part 22*a*1 to be brought into contact with the extension ring portion 21, and the second part 22*a*2 to define a slight clearance between the second part 22*a*2 and the outer peripheral surface of the extension ring portion 21. As a result, a pressure-contact length between the ring body 22 and the extension ring portion 21 is reduced, and hence fitting with pressure-contact is also facilitated. In this case, when an axial length of the first part 22*a*1 is represented by L1, an axial length of the second part 22*a*2 is represented by L2, and an axial length (thickness) of the extension ring portion 21** is represented by L, the lengths are set to satisfy a relationship of $L1<L2$.

In the embodiment and the modification example described above, axial center lines of the through hole 29, the cutout recessed portion 28, and the screw hole 30, into which the bolt member 31 is to be inserted, match each other. Those axial center lines are parallel to an intermediate line of the ring body 22 in a thickness direction, which is indicated by O1 in FIG. 7.

Figure 7:
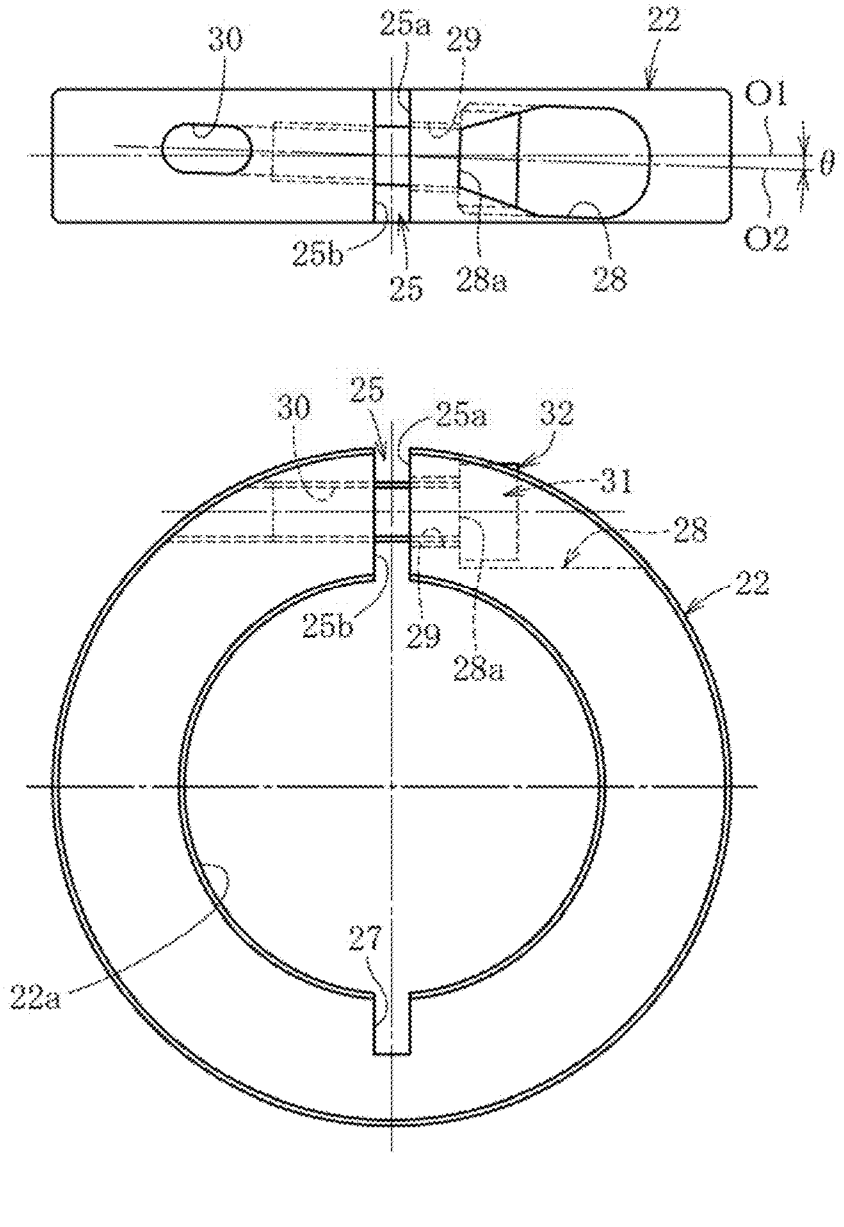
FIG. 7 is a view for illustrating a relationship between a ring body and an extension ring portion of a second modification example.

However, in FIG. 7, an axial center direction of a screw hole 30 is inclined from an inner side toward an opening so as to be separated apart from an intermediate line of the ring body in a thickness direction. That is, an axial center line O2 of the through hole 29, the cutout recessed portion 28, and the screw hole 30 is inclined in a direction in which the cutout recessed portion 28 is separated from the axial line O1.

When the axial center direction of the screw hole 30 is inclined as described above, ease in fastening work with a tool for fastening the bolt member 31 (for example, a torque wrench) can be obtained. That is, the ring body 22 is in the vicinity of the bearing box. When the axial center direction of the screw hole 30 is not inclined unlike in the case described above, it may be difficult to engage a socket of a torque wrench for fastening the bolt member with a head portion of the bolt member in some cases. With the inclination described above, however, a space for achieving engagement can be ensured. Thus, the bolt member 31 can be fastened in a stable manner. In this case, when an inclination angle θ of the axial center line O2 with respect to the axial line O1 is represented by θ, θ is set to about 2°. That is, when the inclination angle θ is smaller than 2°, interference of the torque wrench is unavoidable. When the inclination angle θ is larger than 2°, a space for mounting the bolt member 31 is not left in the ring body 22. When the angle is set as described above, a thrust force at the time of fastening is decreased, and hence a fixing force becomes lower. Thus, it is preferred that the inclination angle θ be set to about 2°.

Figure 8:
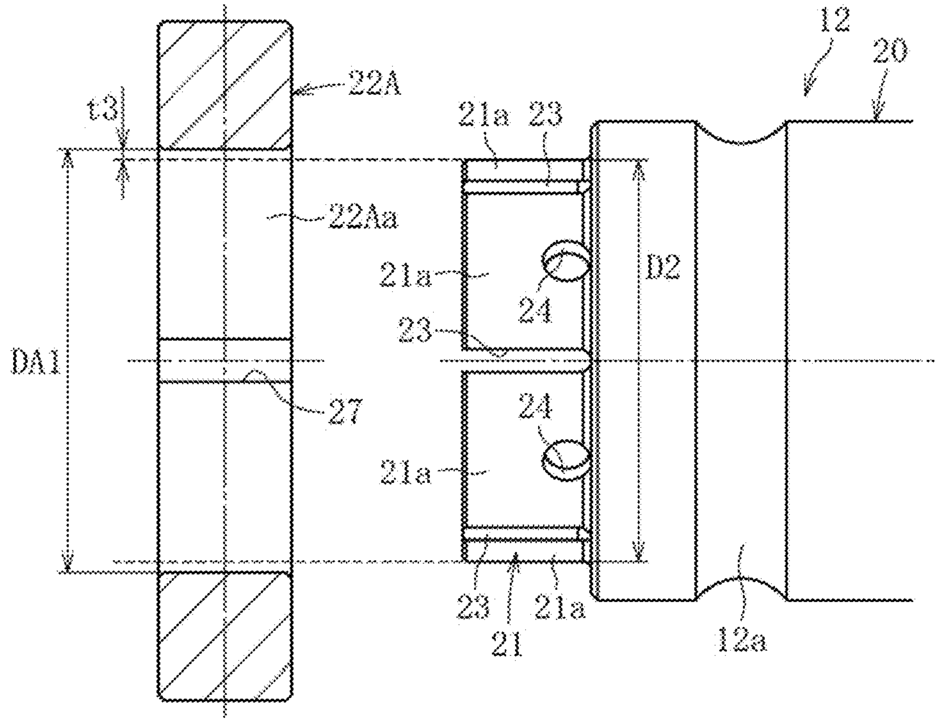
FIG. 8 is a view for illustrating a relationship between a ring body and an extension ring portion, which are to be loose-fitted.

As illustrated in FIG. 8, a ring body 22A, which has an inner diameter dimension larger than an outer diameter dimension of an extension ring portion 21 when being in a free state, can be used. That is, the ring body 22A is fitted over the extension ring portion 21. Under this state, a bolt member 31 is fastened to thereby bring cut end surfaces **25*a* and 25*b* relatively closer to each other. In this manner, segment claws 21*a* are bent radially inward with respect to their inner ring main body side as a pivot to be brought into pressure-contact with a rotary shaft 3. Thus, the rotary shaft 3** can be mounted in an insert bearing unit U.

Before the fastening, however, the ring body 22A is fitted over the extension ring portion 21 by so-called clearance fit, that is, loose fit. That is, when an inner diameter dimension of the ring body 22A is represented by DA1, and an outer diameter dimension of the extension ring portion 21 is represented by D2, the dimensions are set so as to satisfy a relationship of $DA1>D2$. A clearance t3 in this case is set to a value that allows the clearance fit.

Thus, when a screw is fastened to the ring body 22A, there is a risk of causing a shift of the ring body 22A with respect to the extension ring portion 21 by the amount corresponding to the clearance. Hence, workability in mounting is low. Further, when the fixing is performed under a state in which the ring body 22A is shifted, the ring body 22A is fixed in a state of being inclined with respect to the rotary shaft 3. Thus, there arises a risk in that stable performance cannot be obtained as the insert bearing unit.

Figure 9:
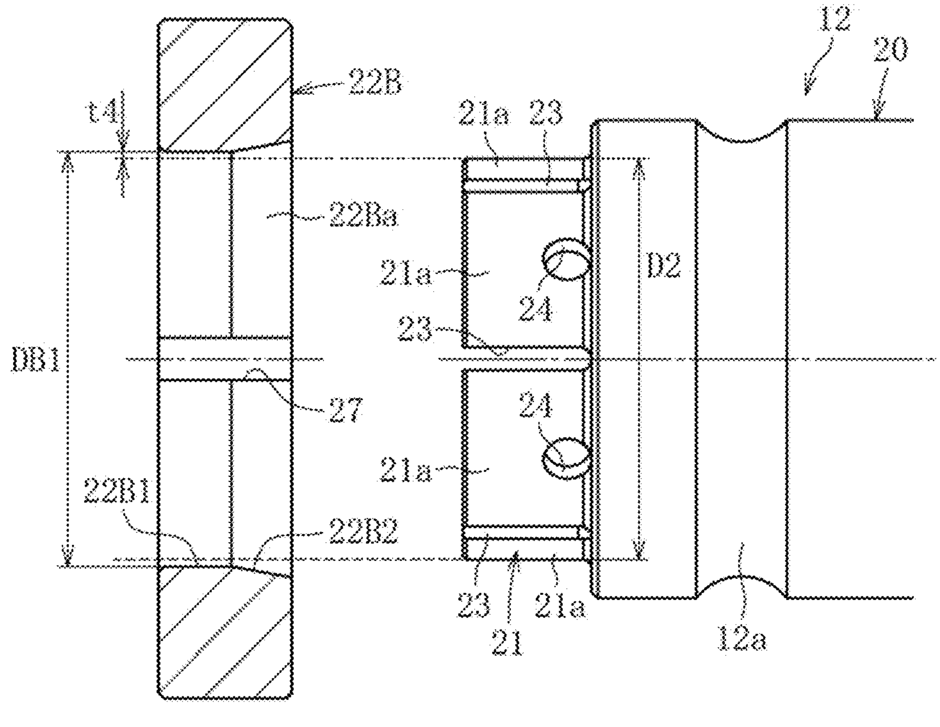
FIG. 9 is a view for illustrating another relationship between a ring body and an extension ring portion, which are to be loose-fitted.

Further, a ring body 22B illustrated in FIG. 9 has a radially inner surface 22Ba comprising a first part 22B1 on an axially outer side and a second part 22B2 on an axially inner side. The first part 22B1 has a cylindrical surface shape. The second part 22B2 has a conical shape with a diameter increased axially inward from the first part 22B1. In this case, as illustrated in FIG. 9, an inner diameter dimension of the first part 22B1 is set larger than an outer diameter dimension of an extension ring portion 21 when the ring body 22B is in a free state. The conical shape of the second part 22B2, which has the diameter increased axially inwardly from the first part 22B1, allows easy fitting of the ring body 22B over the extension ring portion 21.

Also with the ring body 22B illustrated in FIG. 9, the ring body 22B is radially contracted by fastening a bolt member 31 to thereby allow segment claws 21*a* to be brought into pressure-contact with a rotary shaft 3. Thus, the rotary shaft 3 can be mounted into an insert bearing unit. Before the fastening, however, the ring body 22B is fitted over the extension ring portion 21 by so-called clearance fit, that is, loose fit. When an inner diameter dimension of the first part 22B1 of the ring body 22B is represented by DB1, and an outer diameter dimension of the extension ring portion 21 is represented by D2, the dimensions are set so as to satisfy a relationship of DB1>D2. A clearance t3 is set to a value that allows the clearance fit, and a clearance dimension t4 between the first part 22B1 and the rotary shaft 3 is also set to a value that allows the clearance fit.

Thus, when a screw is fastened to the ring body 22B, there is a risk of causing a shift of the ring body 22B with respect to the extension ring portion 21 by the amount corresponding to the clearance. Hence, workability in mounting is low. Further, when the fixing is performed under a state in which the ring body 22B is shifted, the ring body 22B is fixed in a state of being inclined with respect to the rotary shaft 3. Thus, there arises a risk in that stable performance cannot be obtained as the insert bearing unit.

Further, the insert bearing unit according to the present invention has the fixing structure for an insert bearing unit according to the present invention. Fixing work to the rotary shaft can be facilitated, and hence a worker who performs mounting is not required to have skills or experience. In addition, the ring body can be prevented from being inclined, and hence precise mounting (fixing) can be performed.

The embodiment of the present invention has been described above. Various modifications are possible to the present invention without being limited to the embodiment described above. For example, a bearing for a self-aligning roller or a self-aligning ball bearing can be used as the rolling bearing 1. Further, one opening portion of the bearing box 22 may be closed with an end plate.

The number of slits 23 formed in the extension ring portion 21 may be appropriately increased or decreased. At least about three slits 23 are required. Further, the thickness of the extension ring portion 21 can also be appropriately set. The thickness is set to a value that allows the segment claws 21*a* to be bent radially inward when the ring body 22 is radially contracted. Further, the extension ring portion 21 may have different thicknesses on the axially outer end side and on the axially inner end side.

An axial length of the extension ring portion 21 and an axial length of the ring body 22 may be set to the same dimension or different dimensions. When the axial lengths are set to different dimensions, the axial length of the extension ring portion 21 can be set larger than the axial length of the ring body 22 or the axial length of the ring body 22 can be set larger than the axial length of the extension ring portion 21.

In the ring body 22 illustrated in FIG. 1 or the ring body 22 illustrated in FIG. 6, the radially inner surface 22*a* to be press-fitted over the extension ring portion 21 may have a conical shape. Further, in FIG. 6, the second part 22*a*2 may have a conical shape as illustrated in FIG. 9.

REFERENCE SIGNS LIST

1 bearing
2 bearing box
3 rotary shaft
21 extension ring portion
21*a* segment claw
22 ring body
22A ring body
22B ring body
22*a* radially inner surface
23 slit
25 cut portion
25*a* cut end surface
25*b* cut end surface
29 through hole
30 screw hole
31 bolt member
U insert bearing unit
θ inclination angle

The invention claimed is:

1. A fixing device for an insert bearing unit, the fixing device being configured to fix a rotary shaft to an insert bearing unit formed by combining a bearing and a bearing box, the fixing device comprising:

an extension ring portion configured to be fitted over the rotary shaft, the extension ring portion being formed integrally and continuously with an inner ring of the bearing; and a ring body configured to be fitted over the extension ring portion, wherein the extension ring portion has slits extending in an axial direction and being opened axially outward, wherein the ring body is a non-endless ring body having a cut portion formed in a part of the ring body, wherein opposed cut-portion end surfaces of the cut portion are separated from each other by a predetermined distance under a state in which the ring body is press-fitted over the extension ring portion of the inner ring, wherein the cut-portion end surfaces are brought relatively closer to each other to radially contract the ring body by fastening a fastening member to be mounted into the ring body so that a radially contracting force for radial contraction is applied to the extension ring portion to bring the extension ring portion into close contact with the rotary shaft, wherein the fastening member comprises a bolt member to be arranged on one cut-portion end surface side, and a screw hole with which the bolt member is to be threadably engaged formed on another cut-portion end surface side, wherein the cut-portion end surfaces are brought relatively closer to each other by threadably advancing the bolt member into the screw hole, and wherein an axial center direction of the screw hole is inclined away from the bearing from a side opposite to a head portion of the bolt member toward a side of the head portion of the bolt member threadably engaged with the screw hole.

2. The fixing device for an insert bearing unit according to claim 1, wherein the ring body has a recessed groove in a radially inner surface of the ring body so as to be 180-degrees opposite to the cut portion with respect to an axial center, the recessed groove extending in an axial direction and being opened on both end surfaces of the ring body.

3. The fixing device for an insert bearing unit according to claim 1, wherein the ring body has a radially inner surface comprising a first part and a second part, the first part being configured to be brought into pressure-contact with the extension ring portion and the second part being configured to define a clearance between the second part and an outer peripheral surface of the extension ring portion when the ring body is fitted over the extension ring portion, wherein the first part is positioned at an axially outer side of the extension ring portion.

4. An insert bearing unit, comprising:

a bearing comprising:

an inner ring and an outer ring;

rolling elements provided between the inner ring and the outer ring; and a cage configured to hold the rolling elements; and a bearing box, wherein the insert bearing unit comprises a fixing device for an insert bearing unit of claim 3.

5. An insert bearing unit, comprising:

a bearing comprising:

an inner ring and an outer ring;

rolling elements provided between the inner ring and the outer ring; and a cage configured to hold the rolling elements; and a bearing box, wherein the insert bearing unit comprises a fixing device for an insert bearing unit of claim 2.

6. An insert bearing unit, comprising:

a bearing comprising:

an inner ring and an outer ring;

rolling elements provided between the inner ring and the outer ring; and a cage configured to hold the rolling elements; and a bearing box, wherein the insert bearing unit comprises a fixing device for an insert bearing unit of claim 1.

* * * * *